Figure 1:
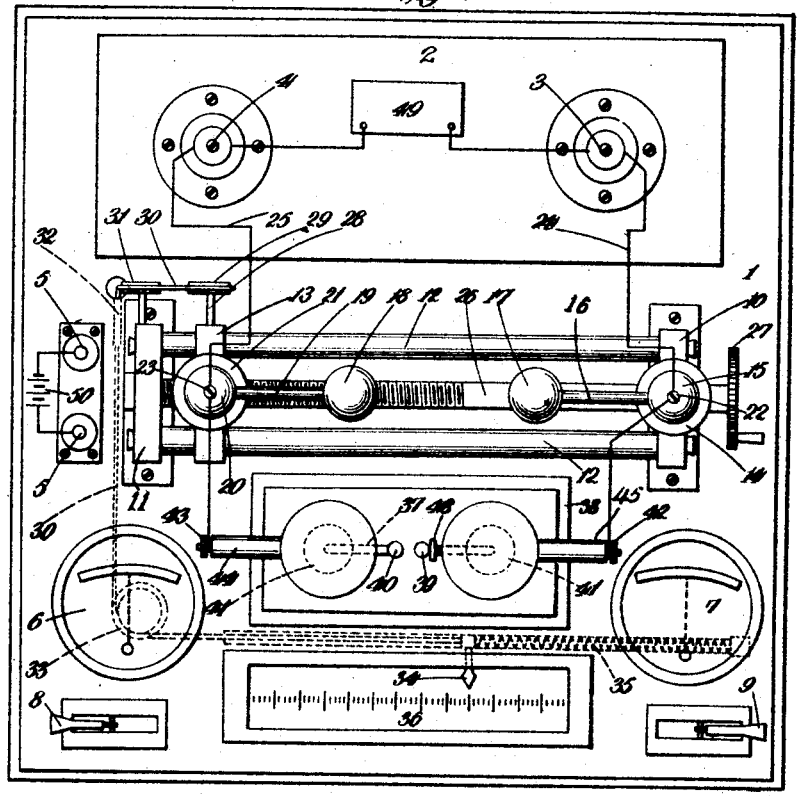

Dec. 15, 1925.  1,565,721
A. W. EMPSON
APPARATUS FOR DETERMINING DIELECTRIC STRENGTH
Filed Jan. 17, 1923

Alfred Walker Empson
INVENTOR
BY Seward Davis
ATTORNEY

Patented Dec. 15, 1925.

1,565,721

UNITED STATES PATENT OFFICE.

ALFRED WALKER EMPSON, OF LONDON, ENGLAND.

APPARATUS FOR DETERMINING DIELECTRIC STRENGTH.

Application filed January 17, 1923. Serial No. 613,308.

*To all whom it may concern:*

Be it known that I, ALFRED WALKER EMPSON, a British subject, residing at 39 Victoria Street, Westminster, London, England, have invented a new and useful Improvement in Apparatus for Determining Dielectric Strength, of which the following is a specification.

This invention relates to improvements in apparatus for determining the dielectric strength of materials.

The objects of this invention are to combine the several elements of the apparatus into compact form adapted, if required, to be readily portable, and also to obtain a direct reading in terms of applied voltage of the length of the gap in the spark gauge employed.

Apparatus according to this invention is preferably, though not necessarily, constructed and arranged so as to constitute a portable instrument. It is primarily adapted for determining the dielectric strength of fluids such as transformer oil, but it may with slight modification be adapted and employed for determining the dielectric strength of other materials such as paper, fibre, porcelain and so forth.

This invention may be stated to consist of apparatus for determining dielectric strength comprising in combination a source of high potential electromotive force, test electrodes conductively connected to said source, a spark gauge connected in parallel with said test electrodes, means for varying the length of gap in said spark gauge, and an indicating device whose scale is calibrated in predetermined units, for example volts, actuated by said means. The high potential source of electromotive force is provided, according to the preferred arrangement, by employing a source of low potential direct current supply in conjunction with an induction coil and contact make and break mechanism in the well known manner. It is to be understood, however, that I do not wish to limit myself to this arrangement since a high potential supply for this purpose may be obtained by other means such as, for example, electric generators of the Wimshurst type.

One specific form of portable instrument according to this invention, comprises in combination with a base or support, an induction coil, vibrating contact make and break mechanism in the primary circuit of said coil, electric terminals adapted to connect said primary circuit with a source of low potential direct current supply, test electrodes conductively connected to terminals in the secondary circuit of said transformer, means for interposing between said electrodes the dielectric medium to be tested, an adjustable spark gauge connected in parallel with said electrodes, an index or pointer, mechanical means for displacing said index or pointer as a predetermined function of the length of gap in said spark gauge, and a scale or chart calibrated in predetermined units, e. g. volts cooperating with said index to indicate the dielectric strength of said medium.

The function of the variable spark gauge or gap in parallel with the test electrodes is twofold: firstly, it varies the potential applied to the test electrodes, since when the gap is short a comparatively large current flows through the secondary winding of the induction coil and the potential accordingly drops, whereas when the gap is lengthened the current is reduced and the potential rises; secondly, it provides a ready means for indicating at any instant the value of the potential applied to the test electrodes, that potential being substantially equal to the potential across the spark gap. It will be observed that the variable spark gauge operates as a variable resistance in the secondary circuit of the induction coil, but a spark gap is a convenient and simple form of resistance to employ.

This invention is illustrated in the accompanying drawings, in which:—

Figure 2:
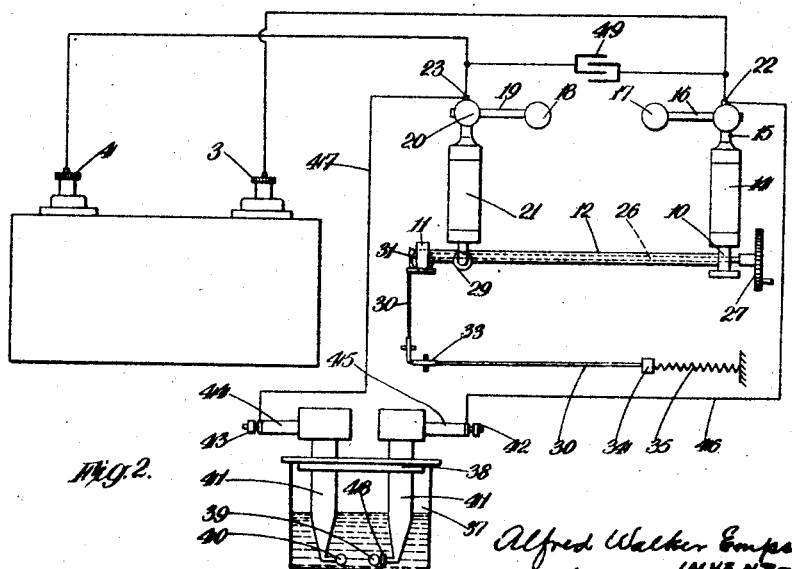

Figure 1 is a diagrammatic plan view of apparatus embodied in a portable instrument, and Figure 2 represents circuit details of the apparatus.

Referring to the drawings, 1 is the intrument box-like supporting base, 2 an electric transformer device comprising vibratory make-and-break contact mechanism in the primary circuit and 3 and 4 are the high tension terminals of the secondary circuit. Direct current is taken from an external source through terminals 5, and is led to the primary circuit of the transformer 2 by conductors concealed within the base 1. An ammeter 6, voltmeter 7, "off" and "on" switch 8, and reversing switch 9 are suitably disposed on the base 1 and coupled to the primary circuit.

Blocks 10 and 11, secured to the base 1, support cylindrical rods 12 on which is slidably mounted a third block 13. The block 10 carries an insulating standard 14, of glass for example, on the top of which is fitted a metal cap 15 in which is adjustably mounted a rod 16 secured to the spherical terminal 17. In a similar manner the other spherical terminal 18 is supported by a rod 19, cap 20, insulating standard 21 and the movable block 13. Terminal elements 22, 23 on the caps 15, 29 respectively are connected to the high tension terminals 3, 4 by leads 24, 25.

The spherical terminals 17 and 18 constitute a spark gauge whose gap can be varied by displacing the block 13. Convenient means for moving the block 13 comprise a shaft 26 threaded into said block and freely mounted in the blocks 10 and 11, and a wheel 27 for rotating the shaft 26.

The block 13 carries a spindle 28 on which is mounted a pulley wheel 29, and a cable 30, one end of which is fixed, passes round this pulley wheel 29 and thence over the pulleys 31, 32 and 33 to an index 34 biased by a spring 35. In this manner variations of the length of the gap between the spark terminals 17 and 18 are reproduced by displacements of the index 34. A scale 36 co-operating with this index is calibrated, for example experimentally, and is adapted to give a direct reading in volts of the breakdown voltage of the gap between the terminals 17 and 18. The setting of the index and scale may from time to time be tested and adjusted by bringing the index over the zero point on the scale and ensuring that the terminals 17 and 18 are then in contact. Small adjustments in the setting of these terminals are carried out by movement of one or both rods 16 and 19 in their respective mountings in the caps 15 and 20 which are provided with suitable locking screws for this purpose.

For testing the dielectric strength of oil, for example, a transparent cell or container 37 for the oil is supported in a recess or well on the instrument base 1, and is provided with a lid or cover 38 of insulating material. Test electrodes 39 and 40 are held submerged in the oil by means of the insulating plugs 41 respectively carried by the cover 38. The terminals 42 and 43 are connected to these electrodes by conductors embedded in insulating blocks 44 and 45 and the plugs 41. Leads 46 and 47 connect up these terminals in parallel with the terminals 22 and 23 respectively.

In order to maintain the correct gap between the test electrodes and to make any slight adjustment that may from time to time become necessary due to wear, the electrode 39 is threaded on its plug 41 and a locking nut 48 is provided as illustrated.

The operation of the apparatus is as follows:—Sufficient of the oil to be tested having been put into the test cell 37 to completely cover the test electrodes, the terminals 5 are connected to a source of low potential direct current. The switch 8 is turned "on", and the spark terminals 17 and 18 being sufficiently close, sparks begin to jump the gap therebetween. The wheel 27 is then rotated to lengthen this spark gap until the spark jumps across the test electrodes instead of across the spark gap. The position of the index on the scale 36 is then noted and the reading obtained gives the breakdown voltage across the oil.

The apparatus hereinbefore described in detail may be considerably modified within the scope of this invention, for example: The spark electrodes 17 and 18 may be other than spherical, the needle type for instance may be employed, which will involve generally a corresponding modification in the calibration of the scale since the relationship between applied voltage and length of gap varies with the type of electrode. Although generally advantageous to have the scale calibrated directly in terms of volts, this feature is not an essential one, for reference tables may be employed to convert the scale reading into volts, if, for instance, the length of gap is directly indicated as such. The test electrodes may take various forms according to the nature of the medium to be tested, for example discs, points and so forth or combinations of these types, the former being especially adaptable for use in testing solid dielectric substances. The means for displacing the index according to the length of gap in the spark gauge may be modified in many ways and in some cases it is contemplated to employ mechanism comprising for instance an escargot, for producing equal index movements corresponding to equal changes of voltage.

When using an induction coil as the source of high potential electromotive force, I may employ a condenser 49 of suitable capacity connected in parallel with the high tension windings of the said coil, with the object of smoothing out the peaks in the current wave, thus securing more constant electrostatic attraction of the fibrous and other impurities in a liquid dielectric and reducing the time necessary to effect complete breakdown, rendering the time element of less importance.

These and other modifications falling within the scope of this invention as hereinbefore set forth are intended to be included in the appended claiming clauses.

I claim:—

1. Portable apparatus for determining the dielectric strength of oil and other insulating materials comprising in combination a supporting base having mounted thereon an induction coil, terminals serving to connect the primary winding of said coil to a secondary battery, relatively movable electrodes constituting a spark gauge, means for varying the distance between said electrodes, fixed test electrodes, electrical conductors connecting said spark gauge and test electrodes in parallel to the secondary winding of the induction coil, an index, a mechanical connection between one movable spark gauge electrode and the index whereby the said index moves as a function of the variation in the spark gauge gap, a scale over which said pointer moves and calibrations disposed on said scale to denote values in terms of dielectric strength substantially as described.

2. Portable apparatus for determining the dielectric strength of oil and other insulating materials comprising in combination a supporting base having mounted thereon an induction coil, terminals serving to connect the primary winding of said coil to a secondary battery, relatively movable electrodes constituting a spark gauge, means for varying the distance between said electrodes, fixed test electrodes, a transparent test cell enclosing said test electrodes, electrical conductors connecting said spark gauge and test electrodes in parallel to the secondary winding of the induction coil, a condenser connected in parallel with said test electrodes, an index, a mechanical connection between one movable spark gauge electrode and the index whereby the said index moves as a function of the variation in the spark gauge gap, a scale over which said pointer moves and calibrations disposed on said scale to denote values in terms of dielectric strength, substantially as described.

ALFRED WALKER EMPSON.